June 29, 1926.
H. H. LEWIS ET AL
1,590,836
METHOD OF MAKING METALLIC DOORS OR THE LIKE
Filed Oct. 29, 1925    2 Sheets-Sheet 1
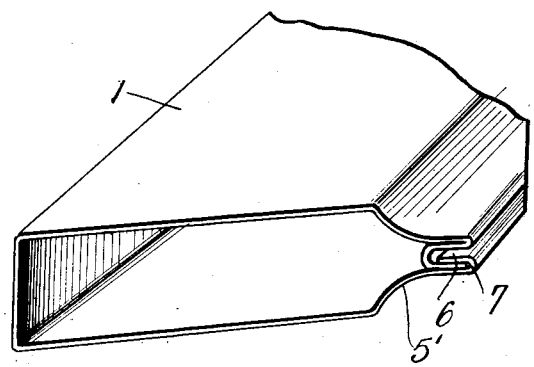
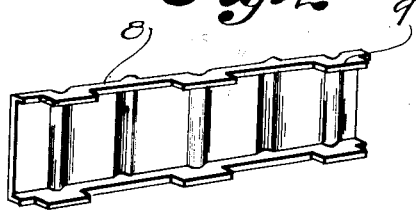
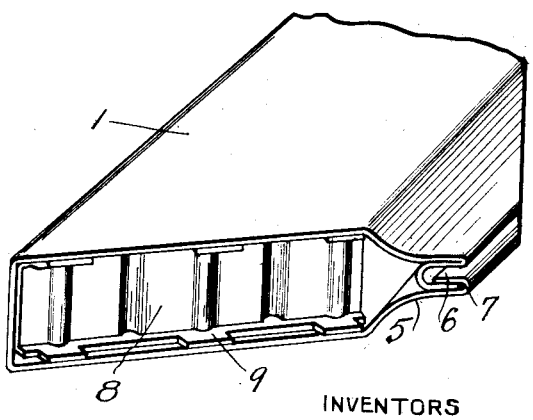
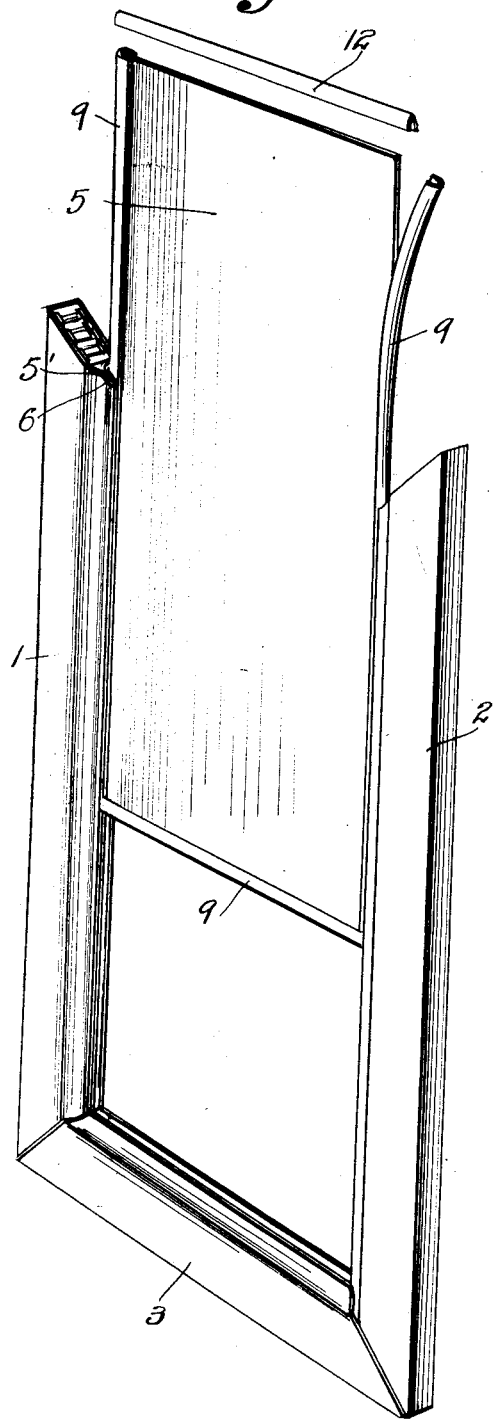
INVENTORS
Harvey H. Lewis
Fred P. M<sup>c</sup> Berty
Albert Van Buren Cutler
Earl B. Rausch
BY
ATTORNEY June 29, 1926.
H. H. LEWIS ET AL
1,590,836
METHOD OF MAKING METALLIC DOORS OR THE LIKE
Filed Oct. 29, 1925       2 Sheets-Sheet 2
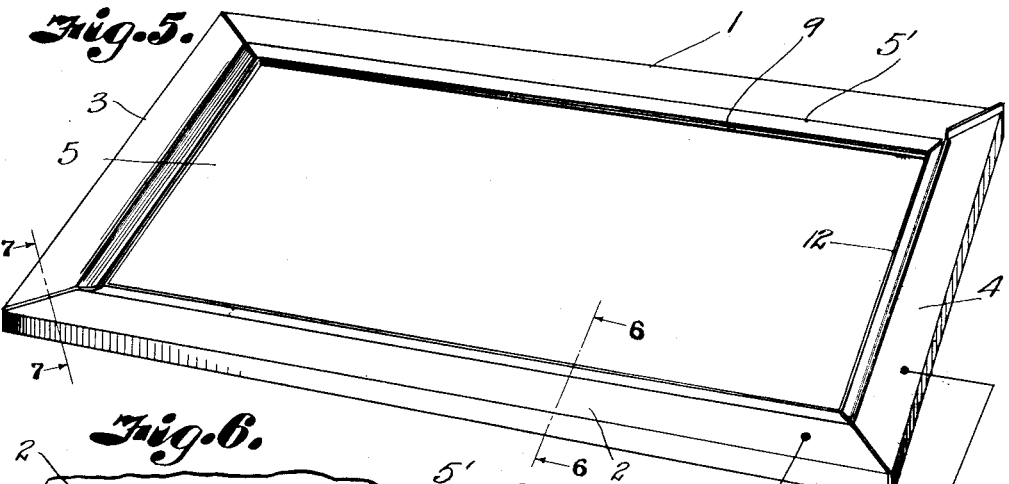
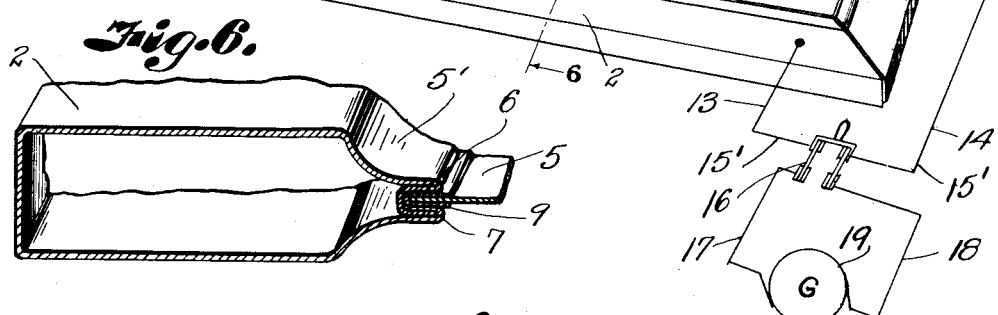
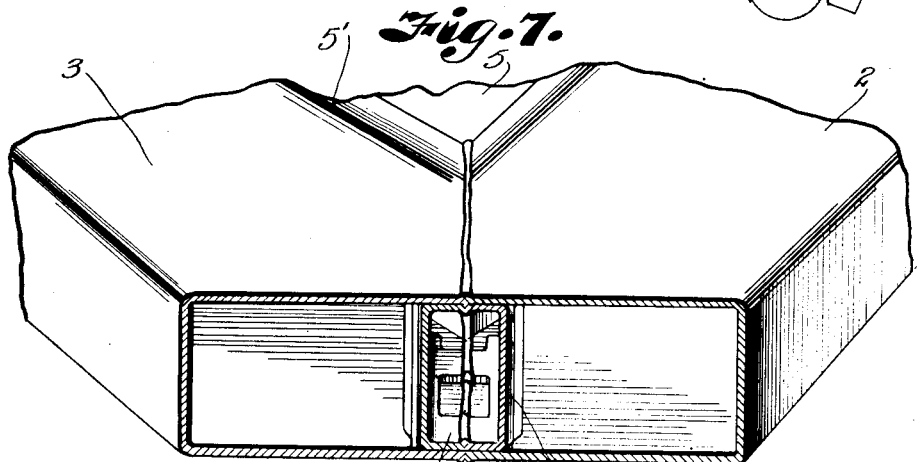
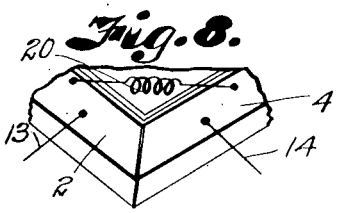
INVENTORS
Harvey H. Lewis
Fred P. McBerty
Albert Van Buren Cutler
Earl B. Rausch
BY
ATTORNEY Patented June 29, 1926.

1,590,836

UNITED STATES PATENT OFFICE.

HARVEY H. LEWIS, OF ATCHISON, KANSAS, FRED P. McBERTY, ALBERT VAN BUREN CUTLER, AND EARL B. RAUSCH, OF WARREN, OHIO, ASSIGNORS TO HENRY WEIS MANUFACTURING COMPANY, OF ATCHISON, KANSAS, A CORPORATION OF MISSOURI.

METHOD OF MAKING METALLIC DOORS OR THE LIKE.

Application filed October 29, 1925. Serial No. 65,712.

Our invention relates to metal doors or the like and more particularly to those comprising stiles, rails and panels which are assembled and connected to form a finished structure, the object of the invention being to provide an efficient method of permanently uniting the stiles and rails which have been assembled about a panel to form a permanent frame for the panel.

Generically the invention consists in forming the stiles and rails into a frame containing the panel, and welding one rail to the stiles adjacent it to form a permanent door structure. The term "door" hereinafter used is intended to include any specific structure coming within the scope of the invention, and while we will describe the invention as employing a specific method of welding, such specific reference is not intended as a limitation to that method only, nor a disclaimer of other known methods adaptable for the purpose.

To aid in the description of the invention, reference will be made to the accompanying drawings, wherein:

Fig. 1 is a fragmentary perspective view of a stile of a door frame.

Fig. 2 is a detail perspective view of a form of spacer employed for retaining the side walls in proper relation.

Fig. 3 is a view like Fig. 1, but with the spacer in the stile.

Fig. 4 is a perspective view of a partly assembled door, particularly illustrating the assembly of the panel and its insulation in the open frame.

Fig. 5 is a perspective view of an assembled door, a welding circuit being shown in diagram.

Fig. 6 is a cross section on the line 6—6, Fig. 5, particularly illustrating the panel insulation.

Fig. 7 is a diagonal section on the line 7—7 Fig. 5, particularly illustrating the welding between the walls and spacers of adjacent stile and rail portions.

Fig. 8 is a perspective view of a corner of a door, illustrating a modification of the invention.

Referring more specifically to the drawings:

1 and 2 designate the stiles, 3 and 4 designate the rails, and 5 the panel of a metal door of conventional construction, the stiles and rails each consisting of a single piece of sheet metal bent to form a flat, tubular body with its edges shaped to a moulding 5', a panel groove 6 and lap joint 7, the ends of each stile and rail being cut diagonally to form mitre joints with adjacent stiles when the parts are assembled.

Located within the open ends of each stile and rail are spacers 8, each preferably consisting of a ribbed channel member of such width as to fit snugly within the stile and having lips 9 projecting from the free edges of its side walls, the spacers being located in the stiles and rails with their channels facing outwardly and the ribs projecting slightly beyond the edges of the walls of the stiles and rails, for a purpose presently described.

Assuming the stiles and rails to be constructed as described and properly dimensioned, the first step of assembly is to connect the stiles with a rail, preferably by welding, to form an open end frame (Fig. 4). An insulation strip 9 (preferably shellacked tape) is then applied to the sides and one end edge of the panel, and the panel slipped into the frame, the edges of the panels fitting into the grooves 6 but being separated from direct contact with the frame by the insulation strip. An insulation strip 12 having been applied to the free edge of the panel, the other rail is fitted into the open end of the frame, its groove 6 receiving the insulated end of the panel and its end edges forming a mitre joint with those of the stiles, the edges of the lips on the rail spacers contacting with like lips on the stile and rail spacers and holding the edges of the stile walls slightly apart. During this step of assembly a strip of insulating material is located between one end of the rail and the end of the adjacent stile, to prevent flow of current at this point.

Conductors 13—14 of a welding circuit indicated by the wires 15¹—15¹, switch 16, wires 17—18 and a source of current 19, are then applied to the non-insulated rail and stile, so that when the switch is closed, current passing through or flashing between the edges of the spacer lips and stile and rail walls brings them to a welding heat.

Whether either flash or butt welding is employed, the edges of the spacer lips are first thrown up and then those of the stile and rail walls; in either event a follower clamp being employed to press the edges together so that the weld may be effected following the application of the heating current. While we prefer to employ spacers having the projecting lips in order to secure the benefit of the added metal at the joint, such is not essential as the lips may be omitted and the edges of the stile and rail brought to close contact originally and the current passed directly between a stile and rail and the flanges of the spacers. In either event, the weld will occur between the walls of one stile and those of the adjoining rail and between spacer and spacer, making a firm, strong joint.

When the first weld has been effected, the insulation strip is removed from between the other end of the rail and the adjacent end of the other stile, the conductors applied thereto and the welding operation repeated to weld the joint at that point of the frame.

When the flash welding is employed in making this last joint, we prefer to connect the stile with the rail, adjacent the joint, with a wire 20, having less resistance than that afforded by the metal in all of the combined stiles and rails, so that when the ends to be welded are separated to such an extent that the current cannot bridge the gap, it will flow through the wire instead of passing around and heating the frame. When the ends of the stile and rail are brought close together, however, the current will flow or flash directly between the stile and rail and the welding will be effected as heretofore described. With either method of welding, burrs will be formed at the joint but these can be ground down to leave the surface smooth.

It is apparent, therefore, that by employing either of the well known methods of welding under the conditions we have described, we are able to assemble the members of the door into a rigid, permanent structure.

What we claim and desire to secure by Letters Patent is:

1. The method of making metal doors or the like, comprising stile and rail members and a panel, consisting of insulating the panel from the stile and rail members and passing an electric current between a stile and rail member to weld a joint therebetween.

2. The method of making metal doors comprising stile and rail members and a panel, consisting of insulating the panel from the stile and rail members, connecting the adjacent stile and rail members in a welding circuit and flowing current through the circuit to weld the edges of the adjacent stile and rail members.

3. The method of making metal doors or the like, comprising grooved stile and rail members and a panel, consisting of uniting some of the stile and rail members to form an open frame, applying the panel to the frame in insulated relation with the stile and rail members of the frame, applying a closing rail member to the frame and panel in insulated relation to the panel, insulating one end of the closing rail member from an adjacent stile member of the frame, connecting the closing rail member and the other stile member in a welding circuit, and flowing current through the circuit to weld the adjacent edges of said connected members.

4. The method of welding hollow stile and rail members or the like consisting of locating spacers in the ends of the hollow members, locating the ends of complementary hollow members adjacent one to the other, connecting the hollow members in a welding circuit, heating the edges of the hollow members and of the spacers to a molten state by passing current through the circuit and pressing the hollow members and spacers together to weld the same and include the spacers permanently in the welded structure.

5. The method of making metallic doors or the like, consisting in providing hollow frame members, each having an edge groove and having spacers for retaining the walls of the frame members in like spaced relation, providing an insulated panel, applying the grooved portions of the hollow frame members to the panel with the walls of one frame member in alignment with those of the other, and welding the frame members together by passing current between the edges of the frame members.

6. The method of making metallic doors or the like, consisting in providing hollow frame members having grooves at their inner edges and having spacers at their open ends for maintaining the side walls of the frame members in like spaced relation to align the walls of one member with those of the other when the parts are assembled, introducing an insulated panel into the groove of one frame member, applying a second hollow frame member to the first named frame member and to the panel, and welding the ends of the frame member and spacers together by passing current between the facing edges of the frame members and of the spacers.

7. The method of making metal doors or the like, which consists in providing a hollow U-shaped frame structure having grooves at its inner edge, insulating the edges of a panel, introducing the panel into the grooved U-shaped frame structure, so that the insulated portion of the panel is received in the grooves, applying a hollow end member to close the open end of the U-shaped frame structure, maintaining the walls of the U-shaped frame structure and the end member in spaced relation by metallic spacers, and welding the ends of the hollow end member to the free ends of the U-shaped frame structure and to the spacers by passing current between the edges of the U-shaped frame structure and the hollow end member.

8. The method of making metal doors and the like which consists in providing a frame structure having stiles and an end rail with a panel in the frame structure insulated from the stiles and rail, providing a separate rail to close the frame structure, introducing metallic spacing means at the free edges of the stiles and the ends of the separate end rail so that when the end rail is moved against the free ends of the stiles the spacers will be in contact, and passing an electric current through the end rail and the frame structure and between the end rail and the frame structure to effect a weld between adjacent edges of the frame structure and the end rail and between the spacers.

9. The method of making metal doors or the like consisting of assembling stiles and a rail having grooved edges into a U-shaped frame, locating an insulated panel within the frame with its edges within the stile and rail grooves, closing the end of the frame with an end rail having a groove receiving the end of the insulated panel, insulating one end of the closing rail from one of the side frame stiles, passing an electric current between the other end of said end rail and the other stile to weld a joint, removing the insulation from between the closing end rail and said first stile, and passing a current between the stile and rail at the point from which said insulation was removed, to weld a joint between the end of the said stile and said end rail.

In testimony whereof we affix our signatures.

FRED P. McBERTY.
ALBERT VAN BUREN CUTLER.
EARL B. RAUSCH.
HARVEY H. LEWIS.